United States Patent
Baus et al.

(10) Patent No.: US 8,569,711 B2
(45) Date of Patent: Oct. 29, 2013

(54) HE-3 TUBE ARRAY ALIGNMENT MOUNT

(75) Inventors: Edward Joseph Baus, Akron, OH (US); Randy Dixon Austin, Hudson, OH (US)

(73) Assignee: General Electric Company, Schenectady, NY (US)

(*) Notice: Subject to any disclaimer, the term of this patent is extended or adjusted under 35 U.S.C. 154(b) by 203 days.

(21) Appl. No.: 13/333,276

(22) Filed: Dec. 21, 2011

(65) Prior Publication Data
US 2013/0161524 A1 Jun. 27, 2013

(51) Int. Cl.
*G01T 3/00* (2006.01)
(52) U.S. Cl.
USPC .................................................. 250/390.01
(58) Field of Classification Search
USPC .................................................. 250/390.01
See application file for complete search history.

(56) References Cited

U.S. PATENT DOCUMENTS

| | | |
|---|---|---|
| 3,984,691 A | 10/1976 | Allemand |
| 4,521,689 A | 6/1985 | Pritzkow |
| 7,151,266 B1 | 12/2006 | Christo |

FOREIGN PATENT DOCUMENTS

| | | |
|---|---|---|
| KR | 100912279 B1 | 8/2009 |
| TW | 201113925 A | 4/2011 |
| WO | 2004043372 A2 | 5/2004 |

OTHER PUBLICATIONS

Search Report from corresponding GB Application No. 1222191.7, dated Apr. 29, 2013.

*Primary Examiner* — David Porta
*Assistant Examiner* — Hugh H Maupin
(74) *Attorney, Agent, or Firm* — Cooper Legal Group, LLC

(57) ABSTRACT

An arrangement for detecting energy particle impingement includes a support frame and a multi-tube detector pack. Each pack includes multiple detector tubes. Each tube contains at least one sensitive material. Each tube is elongate along a respective axis. The tubes extend parallel with the respective axes being co-planar. Each pack includes mounting tabs located at each axial end. The tabs provide support for the tubes within the pack. At least one of the tabs has at least one securing portion and at least one adjusting portion. Each pack includes at least one operable securing member extending from the respective securing portion to the frame. Operation of the securing member secures the pack to the support frame. Each pack includes at least one operable adjusting member extending from the respective adjusting portion to the frame. Operation of the adjusting member changes an orientation of the pack.

7 Claims, 4 Drawing Sheets

HE-3 TUBE ARRAY ALIGNMENT MOUNT

BACKGROUND OF THE INVENTION

1. Field of the Invention

The invention relates to a detector array having a plurality of detector tubes, and specifically relates to an alignment mount for changing orientation of the plurality of detector tubes.

2. Discussion of Prior Art

A scattering detector arrangement includes a target upon which an energy particle, such as a Neutron, impinges and proceeds therefrom as a "scatter." The arrangement also includes a plurality of detector tubes positioned across an area for receipt of the scattered energy particle (e.g., a scattered Neutron). The plurality of tubes are operatively connected to sensory and/or processing equipment, circuitry or the like. Various properties, characteristics, and other information can be discerned by the scatter impingement location on the detector tubes.

As can be appreciated, the plurality of detector tubes is supported by some type of support structure that can be generically referred to as a support frame. Often the detector tubes are grouped into sub-groups or bundle packs, with the tubes within each pack fixed relative to each other and each pack commonly secured to the support frame. Also, it can be appreciated that precision of mounting location of the detector tubes/packs may be of at least some importance.

In one example, it is desirable to locate (i.e., mount upon the support frame) the detector tubes/pack such that all of the tubes extend with their respective elongate center axes being located within a single plane. However, it should be appreciated that the support frame and/or the detector tubes/packs may have aspects that cause some difficulty in obtaining the goal of having all of the tubes extend with their respective elongate center axes being located within a single plane. For example, the support frame may include aluminum and thus may allow different amounts of sag, dip, or the like at different support points of different detector tubes/packs. As such, there is a need for improvements in the scattering detector arrangement art to help obtain the goal of having all of the tubes extend with their respective elongate center axes being located within a single plane.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect the present invention provides an arrangement for detecting energy particle impingement. The arrangement includes a support frame and at least one multi-tube detector pack. Each detector pack includes multiple detector tubes for operative connection to impingement detection circuitry. Each tube contains at least one material that is sensitive to at least one energy particle impingement. Each tube is elongate and extends along a respective axis. The tubes within the detector pack extends parallel to each other with the respective axes being co-planar. Each detector pack includes mounting tabs located at each axial end of the detector pack. The mounting tabs provide support for the tubes within the detector pack. At least one of the tabs has at least one securing portion and at least one adjusting portion. Each detector pack includes at least one operable securing member extending from the respective at least one securing portion to the frame. Operation of the securing member secures the detector pack to the support frame. Each detector pack includes at least one operable adjusting member extending from the respective at least one adjusting portion to the frame. Operation of the adjusting member changes an orientation of the detector pack relative to the support frame.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
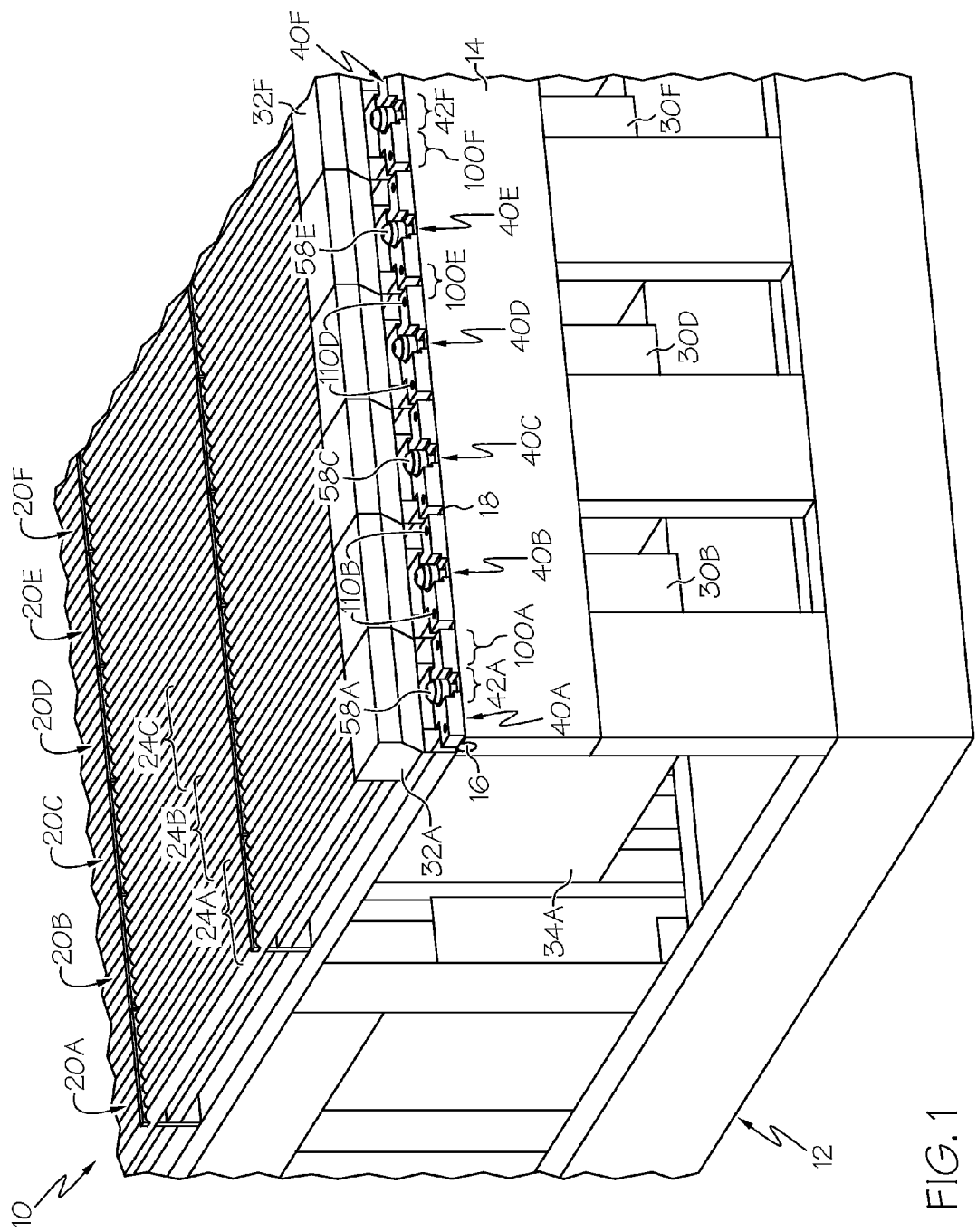
FIG. 1 is a schematized perspective view of an example arrangement for detecting energy particle impingement in accordance with an aspect of the present invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

An example of an arrangement 10 for detecting energy particle impingement in accordance with an aspect of the present invention is shown within FIG. 1. The example arrangement 10 includes a support frame 12. The specific example of the support frame 12 shown within FIG. 2 should not be considered to be a limitation upon the present invention and variations and modifications of the support frame are certainly contemplated. With such said, it is to be appreciated that the support frame 12 includes two support rails 14 (only one rail shown within FIG. 1) for supporting a plurality of multi-tube detector packs 20 as described further below. Each support rail 14 extends in a horizontal direction and the two support rails are parallel to each other. Each support rail 14 may include one or more threaded engagement areas, apertures and/or other structures 16 for receiving threaded engagement members. Also, the horizontal support rails 14 include at least one horizontal extending bearing surface 18 upon which one or portions of the detector packs 20 can be supported in a bearing engagement as described further below.

Within one example, the support frame 12 has portions made of aluminum. The specific aluminum material may be a commonly available extruded aluminum material. Moreover, the portions, including any aluminum portions, of the support frame may be secured to each other via known fastening arrangements such as screws, rivets, welding and the like.

Turning to the multi-tube detector packs 20, it is to be appreciated that any number of detector packs may be present within the arrangement. The example of FIG. 1 shows at least six detector packs 20, which are respectively identified with reference numbers 20A-20F (i.e., with an alphabetic suffix). Hereinafter, the detector packs are collectively and/or generically referred by the numeric designation 20, with the detector packs being referred to by a specific designation with alphabetic suffix to draw attention to individual detector packs.

Each detector pack 20 (FIG. 2 generically shows a detector pack that can represent any of the detector packs 20A-20F) is relatively elongate. Each detector pack 20 extends to be supported by the two horizontal rails 14 of the support frame 12 (see FIG. 1). Each detector pack 20 includes a plurality of detector tubes 24 (see FIG. 3, which generically shows a detector pack that can represent any of the detector packs 20A-20F). Returning briefly to FIG. 1, it is to be noted that the first three detector packs 20A-20C have their respective plurality of detector tubes labeled with corresponding alphabetic suffixes as 24A-24C to help identify the groupings of the detector tubes to respective detector tubes 24. Each detector tube 24 (see FIGS. 2 and 3) is elongate and is cylindrical in shape (i.e., circular cross-section) to have a central axis 26.

It is to be appreciated that the axial length of the plurality of detector tubes 24 within each detector pack may be varied and may be selected upon the size of the area within which detection can occur. Within one example, the detector tubes 24 may be in the range of 50.8-127 cm (20-50 inches). Of course, the length may be lesser or greater than such stated example range. Within the shown example, each detector pack 20 has at least some underlying support structure 28 (generically shown in FIG. 2) that extends below and along the length of the detector tubes 24 for support. The specifics of the support structure 28 may be varied. The variation may be dependent in part upon the length of the tubes 24. As such, the details of the support structure 28 need not be specific limitations upon the present invention. Also, within the shown example, each detector pack 20 has generically shown end cap housing structures 32 located at the two ends of the detector pack 20. The end cap housing structures 32 enclose/shroud ends of the detector tubes 24. The specifics of the end cap housing structures 32 may be varied. The variation may be dependent in part upon particulars of the tubes 24.

Turning to the number of tubes 24 that may be present within each detector pack 20, it should be appreciated that the number may be varied. Within the shown example, the number of tubes 24 within the example detector packs is eight. The number of tubes 24 may be varied for various reasons including a determination based upon the amount of area within which detection is to occur for each detector pack. This determination also may be a factor dependent upon the width of each detector tube 24. Within one example, the width of each detector tube 24 may be 8-25.4 millimeters (0.315 inches-1 inch). Of course, the width of each tube 24 may be less than or greater than the example range.

Turning to the configuration of the detector tubes 24 within each pack, the tubes are arranged such that the central axis 26 of each tube 24 extends coplanar with the central axes 26 of the other detector tubes 24 within the pack. The central axes 26 lie in one common plane. As such, the detector tubes 24 can be considered coplanar.

Each detector tube 24 includes at least one material that is sensitive to impingement of at least one energy particle. Within one example, the energy particle may be a neutron. However, other energy particles and or beams can be the subject of detection by the detector tubes. For example, the detector tubes may detect Gamma radiation. The at least one material that is sensitive to impingement of at least one energy particle can thus be varied.

Turning to the at least one material that is sensitive to energy particle impingement, within one example, helium-3 ($^3$He) gas may be provided within an interior volume of each of the detector tubes 24. Of course, it is to be appreciated that other, different sensitive materials could be utilized within the detector tubes. As one such example B-10 ($^{10}$B) can be utilized within the detector tubes 24.

The operation of the detector tubes 24 to indicate impingement of an energy particle may vary and need not be a specific limitation upon the present invention. Within one example, impingement of an energy particle (e.g., a neutron) causes an electrical output from the respective detector tube 24. In one example, the electrical output is a result of charged particles released in reactions induced by the neutrons. Based upon the material and/or the operation of the detector tubes 24, the detector tubes may have some variation in structure. For example each detector tube may be provided as a cylindrical exterior shell (circular cross-section) bounding an interior volume containing gas (e.g., helium-3). The exterior shell can be constructed of various metals including, but not limited to, stainless steel and aluminum. Different parts of the detector tube 24 may provide an anode and a cathode. Of course, structures of the detector tubes need not be specific limitations upon the present invention.

Each of the plurality of detector tubes 24 within each multi-tube detector pack 20 are operatively connected to associated circuitry, processors or the like for operating the detector tubes and processing information concerning the energy particle impingement. Various properties, characteristics, and other information can be discerned based upon the impingement. In one example, the impingement is associated with the arrangement being within a scattering detector arrangement. The particulars of the associated circuitry, processors or the like can be varied. Variance may be due in part to the material and/or the operation of the detector tubes 24. Of course, the particulars of the associated circuitry, processors or the like need not be specific limitations upon the present invention.

Within the shown example, at least some of the associated circuitry, processors, and the like is housed on-board of the respective detector packs. Within the example, at least some of the associated circuitry, processors, and the like is housed with housing blocks 34 located at one or both ends of the respective detector pack 20. Such housing blocks 34 are schematically shown within the figures and the details of the specific housing arrangement need not be specific limitations upon the present invention. Of course, since some of the circuitry, processors, and the like may be located remote from the detector pack, at least one operative connection (schematically shown as cable 38 in FIG. 2) extends from the detector pack 20 for connection to such remote location.

Similar to the previous uses of alphabetic suffixes, some of the other structures (e.g., the housing blocks described and structures described below) may sometimes have alphabetic suffixes. Use of reference numbers without alphabetic suffixes may be for collective and/or generic reference to the designated item. The use of a specific designation with an alphabetic suffix may be to draw attention to individual designated item. See in particular that FIG. 1 includes the use of alphabetic suffixes because of the presence of plural detector packs 20A-20F.

Figure 2:
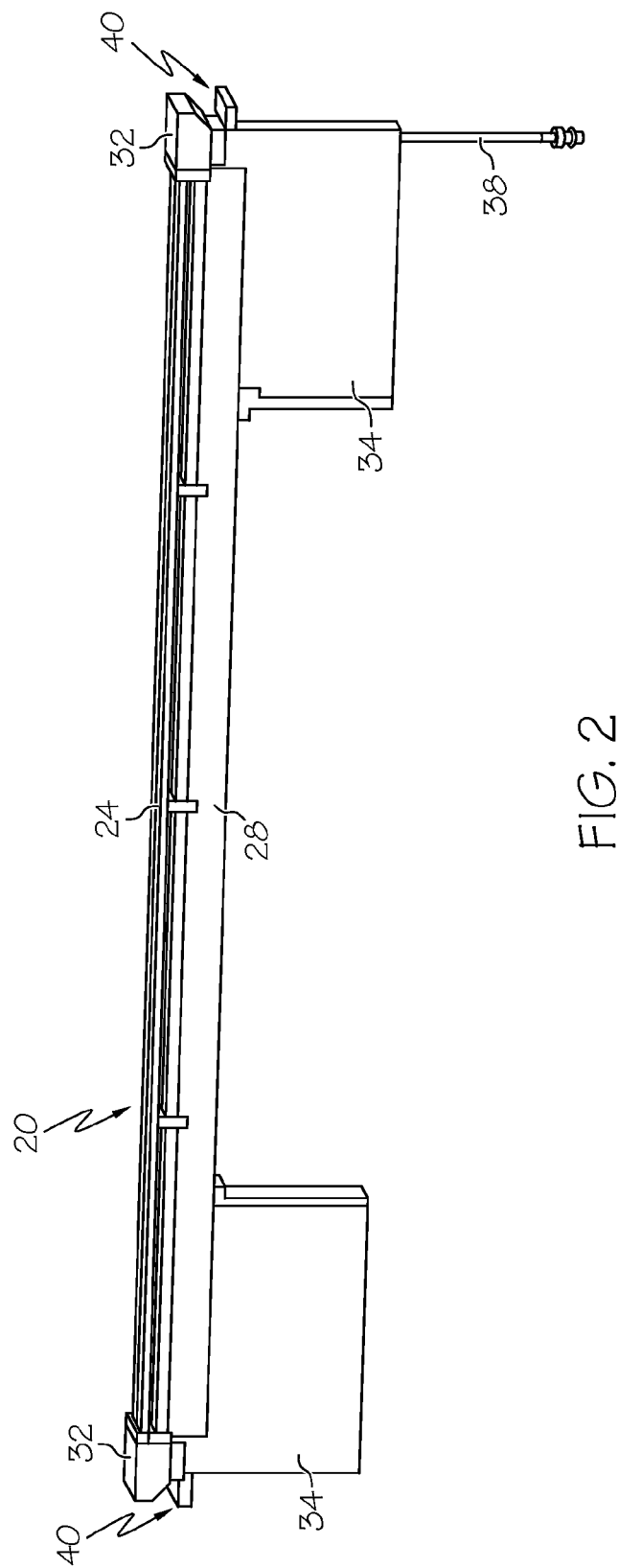
FIG. 2 is a side view of one example detector pack of multiple detector tubes of the arrangement of FIG. 1 and also shows arrowheads indicating possible adjustment movements in accordance with an aspect of the present invention.

Focusing upon the detector pack structure, each detector pack 20 includes a mounting tab 40 located at each axial end of the detector pack (see FIG. 2 for the two tabs schematically shown at each axial end). The two mounting tabs 40 provide support for the respective detector pack 20, and thus the tubes 24 within the detector pack, relative to the support frame 12 (FIG. 1). Specifically, each mounting tab 40 is for supporting engagement with the respective rail 14 of the support frame 12. The example of FIG. 1 shows six tabs 40 of the six shown detector packs 20A-20F, with the tabs respectively identified with reference numbers 40A-40F (i.e., with an alphabetic suffixes). Hereinafter, the tabs are collectively and/or generically referred by the designation 40, with the detector packs being referred to by a specific designation with alphabetic suffix to draw attention to individual detector packs.

Each mounting tab 40 (see FIG. 3) has at least one portion 42 to secure the tab 40 relative to the respective rail 14 of the support frame 12. Within the shown example, the securing portion 42 of the shown example tab 40 includes the center portion of the tab. The shown example of the center portion includes a securing aperture or notch 44 that extends through the tab 40 from an upper surface 46 of the tab to a lower surface 48 of the tab. With the shown example, the aperture 44 has a stepped, upwardly facing shoulder.

Figure 3:
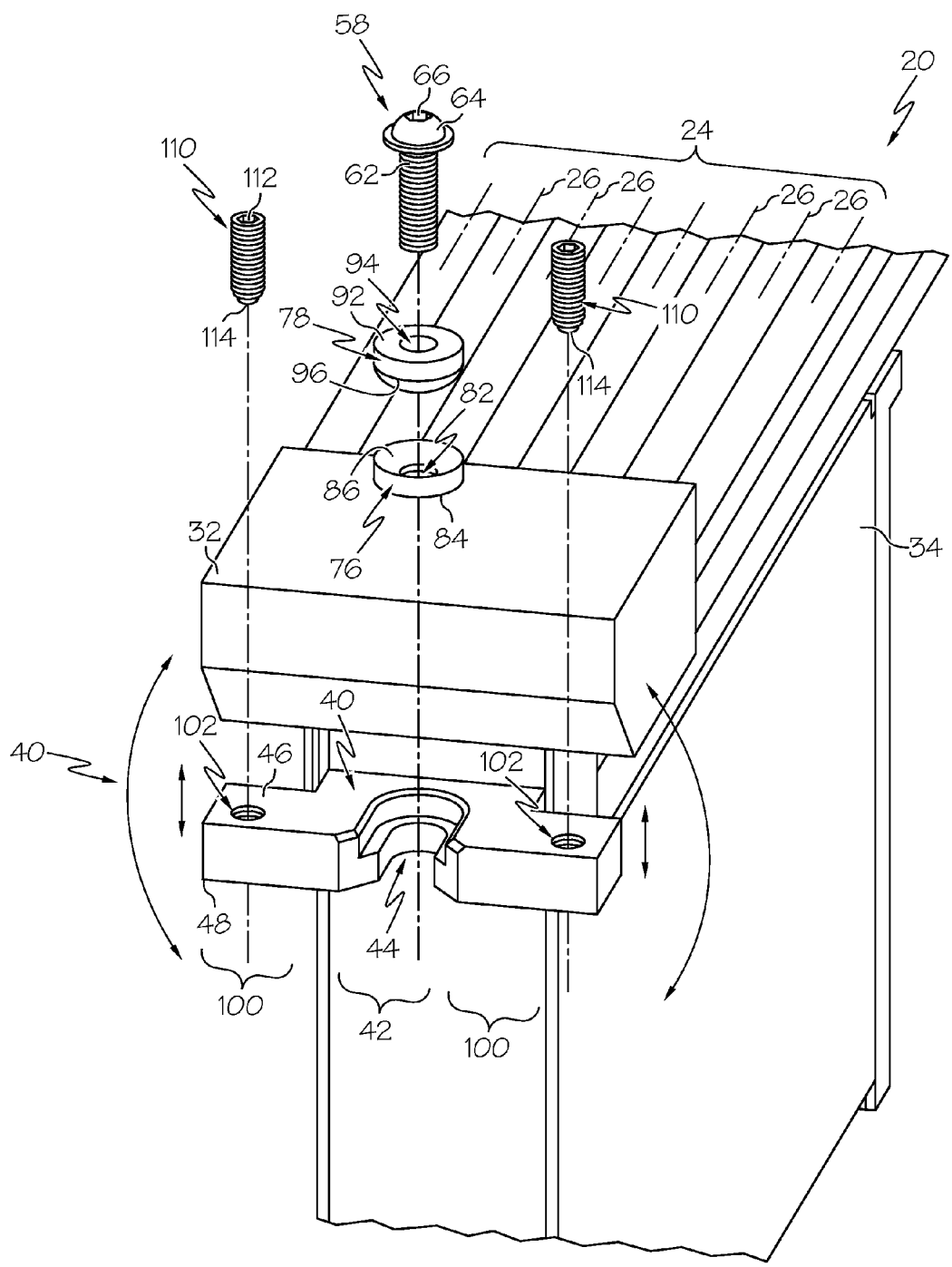
FIG. 3 is an enlarged, perspective view of an end portion of the detector pack shown in FIG. 2 and also shows arrowheads indicating possible adjustment movements in accordance with an aspect of the present invention.
Figure 4:
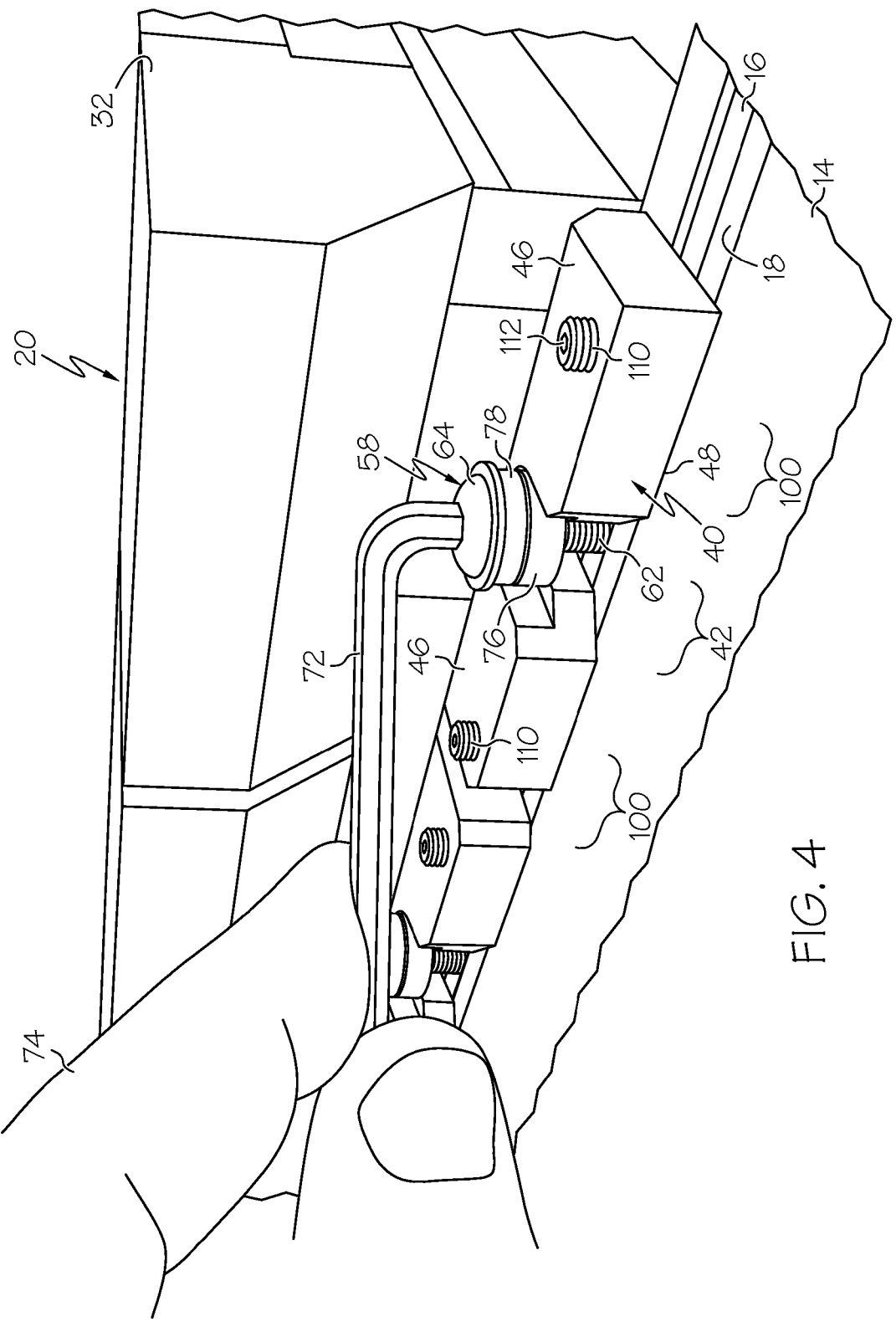
FIG. 4 is an enlarged, perspective view of end portions of the detector packs being mounted upon a frame of the arrangement of FIG. 1 in accordance with an aspect of the present invention.

An operable securing member 58 extends from the securing portion 42 of the tab to the respective rail 14 of the frame 12 (see FIGS. 1 and 4). Within the shown example, the securing member includes a fixation screw 58. The fixation screw 58 has an elongate threaded shaft portion 62 (FIGS. 3 and 4). The aperture 44 through the tab 40 is sufficiently wide to permit passage of the threaded shaft portion 62 of the fixation screw 58 without fixing engagement of the threaded portion against the aperture through the tab. The threaded shaft portion 62 can threadingly engage into the aperture/structure 16 of the respective rail 14 of the support frame 12. The fixation screw 58 also includes an enlarged head 64 with a drive portion (e.g., a hex recess) 66 for engagement by a tool 72 (see FIG. 4) for operation (e.g., tightening or loosening) the fixation screw 58. An operator 74 (only hand shown) operates the tool 72.

Associated with the fixation screw 58 is a spherical washer set 76, 78 (see FIGS. 3 and 4). Specifically, the spherical washer set includes a lower washer 76 and an upper washer 78. The lower washer 76 has a central aperture bore 82 that permits passage of the threaded shaft portion 62 of the fixation screw 58. A bottom 84 of the lower washer 76 is flat for engagement against a surface (e.g., at the shoulder in the aperture) of the mounting tab 40 at the securing portion 42. An upper surface 86 of the lower washer 76 is concave (e.g., hemispherical).

The upper washer 78 has a flat upper surface 92 for engagement against the head 64 of the fixation screw 58. A central aperture bore 94 of the upper washer 78 is sufficiently large to permit passage of the threaded shaft portion 62 of the fixation screw 58. A lower surface 96 of the upper washer 78 is convex in a complimentary shape (e.g., hemispherical) to the concave surface 86 of the lower washer 76. The lower and upper washers 76, 78 can move/pivot relative to each other, with their respective concave/convex surfaces 86, 96 being able to slide relative to each other. As such, the lower and upper washers 76, 78 can be considered to provide a general ball and socket type movement arrangement.

Each mounting tab 40 also includes at least one adjusting portion 100. Within the shown example, each tab 40 includes two adjusting portions 100, with each adjusting portion 100 being at a laterally side of the securing portion 42. Each adjusting portion 100 of the mounting tab 40 includes a threaded bore 102 that extends between the upper and lower surfaces 46, 48 of the mounting tab 40.

Two operable adjusting members 110 extend from the two adjusting portions 100 of the tab 40 to the rail 14 of the frame 12. Operation of one or both of the adjusting members 110 can change the orientation of the tab 40 and thus the orientation of the detector pack 20 relative to the support frame 12. Within in the shown example, the adjusting members 110 include set screws 110 that are threadingly engaged into the threaded bores 102 at the two adjusting portions 100 of the mounting tab 40. Each set screw 110 is threaded along its length and has a portion for engagement by a tool (not shown, also operated by the operator 74). Within the shown example, the set screws 110 include an Allen or hex recess 112 at an upper end and bearing surfaces 114 at lower ends. The set screws 110 extend through the tab 40 and into bearing engagement with the bearing surface 18 of the rail 14 of the support frame 12.

Operation of each set screw 110 (e.g., turning the set screw with the tool to threadingly move the respective set screw axially relative to the adjusting portion 100 of the tab 40 to expose a lesser or greater amount of the set screw below the tab) causes movement of the respective adjusting portion 100 of the tab 40 relative to the rail 14 of the support frame 12. Each of the set screws 110 can be operatively adjusted (i.e., threaded further in or out) independent of the other set screws at a respective tab. As such, the vertical offset height of the tab 40, and thus the tube detector pack 20, away from the bearing surface 18 of the rail 14 of the support frame 12 can be varied up or down. See the up-down arrow heads within FIG. 3. As such there may be a varied amount of space (i.e., offset distance) between the bearing surface 18 of the rail 14 and the lower surface 48 of the tab 40 at the adjusting portions 100.

Also, the lateral tilt or pivot of the tab 40, and thus the tube detector pack 20, relative to the bearing surface 18 of the rail 14 of the support frame 12 can be varied. Such tilt or pivot movements are indicated by the curved motion arrows shown within FIG. 3. Still further, due to the presence of two mounting tabs 40 with associated adjusting portions at the two ends of each tube detector pack 20, tilt along the length of the tube pack can be achieved by elevating or lowering the tabs 40 relative to the respective rails 14 of the support frame 12. As such, multiple degrees of motion of the tube pack 20 are possible via various combinations of operation of the set screws 110 at the tabs 40.

Various movements caused by operation of one or both of the set screws 110 is accommodated by the spherical washer set 76, 78 associated with the fixation screw 58. As such, as the set screws 110 are operated, the lower washer 76 and the upper washer 78 can move relative to each other (e.g., ball and socket style) due to their concave/convex mating surfaces. Although some operation of the set screws 110 may be possible with the fixation screw 58 in a tightened condition, it may be prudent to loosen the fixation screw 58 for ease of adjustment movement. Once the desired orientation is obtained by operation of one of both of the set screws 110, the fixation screw 58 can be tightened via operation of the fixation screw to threadingly tighten the fixation screw on the rail 14 of the support frame 12. Thus, the fixation screw 58 helps retain the respective tab 40, and the tube detector pack 20 accordingly, at the desired orientation.

It is to be appreciated that movement of one or more or both of the tabs 40 on each tube detector pack 20 changes the orientation of the plane through which the central axes 26 of the tubes 24 extend. In other words, operation of at least one set screw (i.e., an adjusting member) 112 changes an orientation of the respective detector pack (e.g., 20F) relative to the support frame 12. Accordingly, each tube pack (e.g., 20F) can be independently moved to orient the associated plane containing the tube central axes 26. Such independent movement of the planes allows the planes of the several tube detector packs 20A-20F to be arranged to be coplanar to each other, parallel to each other, or any other desired orientation. In the disclosed example, one aspect is an intention to obtain a coplanar arrangement of all of the planes associated with the plurality of tube detector packs 20.

In one example, adjustment orientation of all of the tube detector packs 20 such that all of the tubes 24 are coplanar (e.g., all of the centers lie in a single plane) can provide for improved accuracy concerning energy particle impingement detection.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. An arrangement for detecting energy particle impingement, the arrangement including:
   a support frame;
   at least one multi-tube detector pack with each detector pack including:
      multiple detector tubes for operative connection to impingement detection circuitry, each tube containing at least one material that is sensitive to at least one energy particle impingement; each tube being elongate and extending along a respective axis, the tubes within the detector pack extending parallel to each other with the respective axes being co-planar; and
      mounting tabs located at each axial end of the detector pack, the mounting tabs providing support for the tubes within the detector pack, at least one of the tabs having:
         at least one securing portion; and
         at least one adjusting portion;
      at least one operable securing member extending from the respective at least one securing portion to the frame, operation of the securing member secures the detector pack to the support frame; and
      at least one operable adjusting member extending from the respective at least one adjusting portion to the frame; operation of the adjusting member changes an orientation of the detector pack relative to the support frame.

2. An arrangement as set forth in claim 1, wherein the at least one material that is sensitive to at least one energy particle impingement contained by each tube is sensitive to at least neutron particle impingement.

3. An arrangement as set forth in claim 1, wherein the change in orientation of the detector pack via operation of the adjusting member includes a change in orientation of a plane within which the axes of the tubes of the detector pack are located.

4. An arrangement as set forth in claim 1, wherein the change in orientation of the plane within which the axes of the tubes of the detector pack are located includes as least one of tilt in a plane transverse to the plane within which the axes of the tubes of the detector pack are located and tilt in a plane perpendicular to the plane within which the axes of the tubes of the detector pack are located.

5. An arrangement as set forth in claim 1, wherein the at least one securing portion includes an securing aperture portion of the tab, and the at least one operable securing member includes a securing screw extending through the securing aperture portion and into the support frame, operational rotation of the securing screw tightens the screw into the frame.

6. An arrangement as set forth in claim 1, wherein the at least one adjusting portion includes an adjusting aperture portion of the tab, and the at least one operable adjusting member includes a set screw extending through the adjusting aperture portion and into bearing engagement within the frame, operational rotation of the set screw changes a spacing between the adjusting aperture portion of the tab and the frame.

7. An arrangement as set forth in claim 1, wherein the at least one multi-tube detector pack arrangement includes a plurality of detector packs, with each detector pack including respective multiple detector tubes and mounting tabs, the at least one operable securing member includes a plurality of operable securing members associated with respective detector packs, the at least one operable adjusting member includes a plurality of operable adjusting member associated with respective detector packs, and operation of the respective adjusting members can change respective orientations of the detector packs includes changes to orient the respective planes within which the respective axes of the respective tubes of the respective detector packs are located to be co-parallel.

* * * * *